Nov. 16, 1937.  H. J. CRINER  2,099,052
TRAP NEST
Filed April 20, 1936
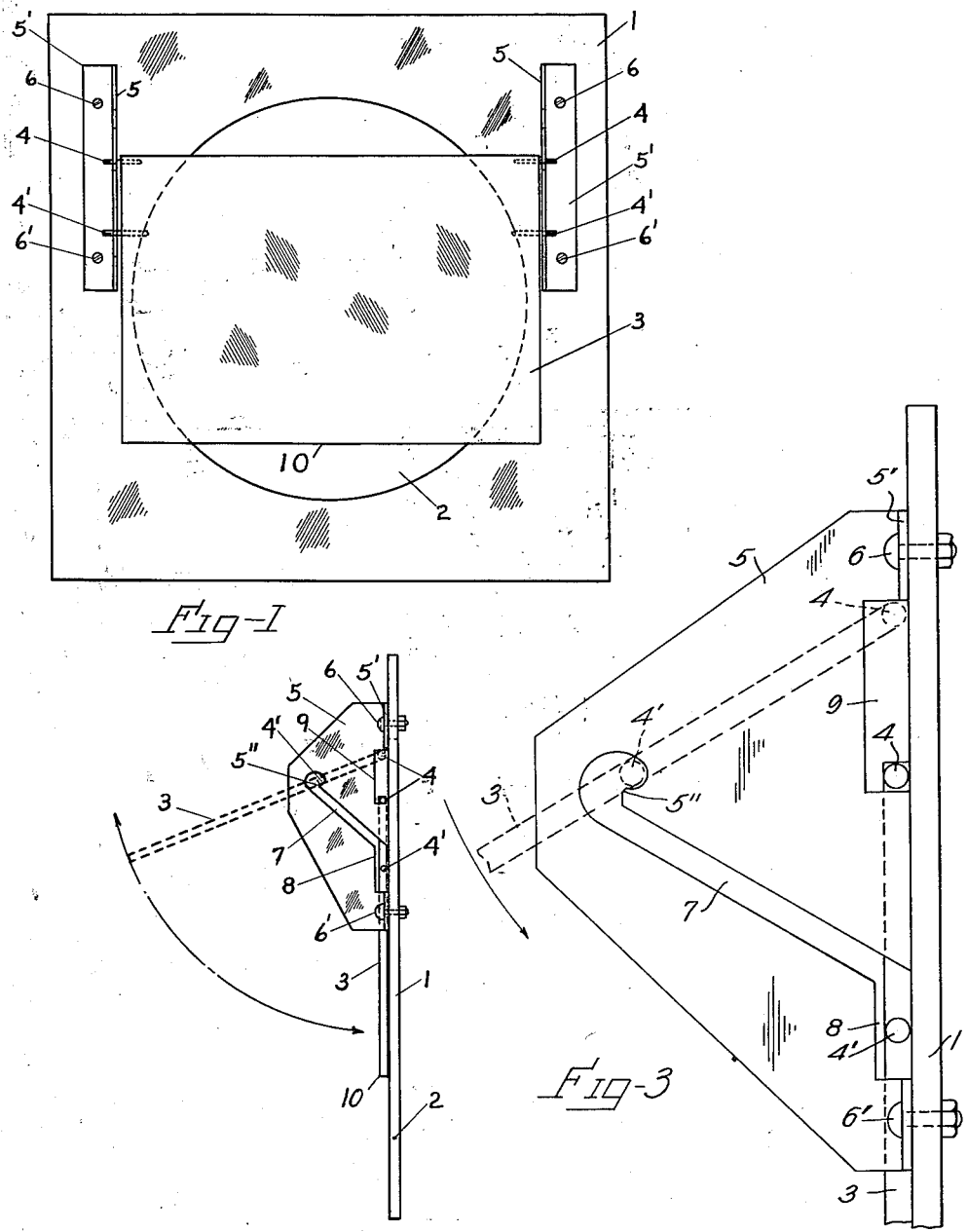
INVENTOR.
Harry J. Criner.
BY
Bush & Bush
ATTORNEYS.

Patented Nov. 16, 1937

2,099,052

UNITED STATES PATENT OFFICE 2,099,052

TRAP NEST

Harry J. Criner, Davenport, Iowa, assignor of one-half to A. G. Bush, Davenport, Iowa Application April 20, 1936, Serial No. 75,367

7 Claims. (Cl. 119—49)

My invention relates to improvements in trap nests.

The objects of my invention are to provide a trap nest of improved simplicity and effectiveness which will hold the trap door, when in its set or charged position, so as to afford very little obstruction to the entrance of a hen into the nest; to provide means whereby, when a hen enters the nest, a slight pressure of the hen's back against the edge of the door will release the catch and permit the door to fall by gravity into its closed position; to provide simple means for locking the door in closed position while the hen is on the nest; and to provide simple, easily operable means for removing the hen from the nest and re-setting the trap door.

I accomplish these objects by the means illustrated in the accompanying drawing, in which,—

Figure 1 is a rear view of the trapping mechanism showing the trap door in its closed position;

Figure 2 is a side elevation of the trapping mechanism showing the door in solid lines in its closed position and showing the door in dotted lines in its open position.

Figure 2 shows a slightly different form of flange from that illustrated in Figure 1.

Figure 3 is a greatly enlarged detail illustrating more clearly the slot, 9, the slot or opening, 7, the shoulder, 5'', and other parts.

Similar numerals refer to similar parts throughout the several views.

My apparatus comprises a front plate, 1, which is preferably a square plate of sheetmetal, sheet fiber, laminated wood, or other suitable material, having a large central opening, 2, formed therein.

Brackets, 5, preferably of sheetmetal, are formed with flanges, 5', and the flanges, 5', may be secured to the plate, 1, by bolts, 6, 6', or other suitable means.

Each bracket, 5, has a vertical slot, 9, cut therein adjacent the front plate, 1. The flange, 5', may be continuous as shown in Figure 1, or it may be interrupted by an upper slot, 9, as shown in Figure 2. A lower slot is cut in each bracket, 5, having a vertical branch, 8, adjacent the front plate, 1, directly under the slot, 9, and an oblique branch, 7, which extends upwardly to the rear from the top or upper end of the branch, 8.

The upper end of the branch, 7, is enlarged and extended forwardly as shown in Figure 2 and a shoulder, 5'', is formed upon the bracket, 5, to afford a rest for the pins, 4', hereafter described, when the trap door, 3, is in its raised position.

Upper pivots, 4, are formed integral with or suitably united to the door, 3, on opposite ends thereof, and lower pivot pins, 4', are likewise formed integral with or suitably united to the door, 3.

When the door, 3, is in its closed position, the pivot pins, 4, rest upon the bracket, 5, at the bottom of the slot, 9, and the pivot pins, 4', rest in the vertical branches, 8, of the lower slots in the brackets, 5, near the middle or lower end thereof. In order to raise the door, 3, to its set or charged position, it may be grasped by its lower edge, 10, by the hand of the operator and pushed upwardly and the lower edge, 10, pushed backwardly until the door, 3, is raised into the position shown in dotted lines in Figure 2.

The slots, 9, are made wide enough to allow a little lateral play of the pivots, 4, therein so that when the door reaches its raised position it can be moved forwardly far enough to cause the pivots, 4', to seat upon the shoulders, 5'', of the bracket, 5, and the overhanging weight of the lower part of the door, 3, will force the pivots, 4, upwardly against the upper ends of the slots, 9, and cause the door, 3, to remain in its raised position.

With the door in this position, when a hen enters through the opening, 2, and walks back to the nest, which is seated the proper distance back of the front plate, 1, and at the proper height, the hen's back will contact the lower edge of the door, 3, and raise it slightly, at the same time carrying it to the rear far enough so that the pivots, 4', will clear the shoulders, 5'' or the shoulders, 5'', may be made small enough so that when the lower end of the door is raised slightly by the hen entering the nest, the pivots, 4', will clear the shoulders, 5'', and the force of gravity will cause the pivots to clear the shoulders as the hen settles down upon the nest without the need of the hen exerting rearward pressure on the edge of the door. The door will then swing downwardly upon the pivots, 4, the pivots, 4', sliding downwardly in the branches, 7, of the lower slots until the door reaches a vertical position, when the pins, 4', will slide downwardly in the branches, 8, of the lower slots and the pins, 4, will slide downwardly in the slots, 9, thereby locking the door against movement either forward or backward.

The hen on the nest will thus be trapped and will be secure against interruption from any other hen, for the door, 3, will be made of sufficient size so that no other hen can get under it when in its vertical position.

I prefer to make the door, 3, and the opening, 2, of such relative size as to leave openings above and below the door for ventilation and the door, 3, may be made of either solid material or of openwork, which will permit the passage of air therethrough so as to improve the ventilation.

When it is desired to remove the hen from the nest, the operator can raise the door and push the lower end thereof inwardly or to the left as shown in Figure 2, thus leaving sufficient space to remove the hen below the door and out of the opening, 2, and the trap door can then be reset as above explained.

I have not attempted to show my trapping arrangement attached to a box or other nest container, as it is obvious that it may be attached to a single box or a series of plates may be attached to a series of nest containers of any suitable size or shape.

While for clearness I have shown the bracket, 5, with a slight indentation of the shoulder, 5", in which the pin, 4', may rest, it is obvious that this indentation is not essential, because the door may be arranged at such an angle in its raised position that the friction due to its weight will prevent displacement from the shoulder. The indentation in which the pin, 4', rests when the door is in its raised position, may be varied in depth and shape as desired or may be entirely omitted.

I do not limit my claims to the precise form shown in the drawing, as it is obvious that various modifications thereof may be made without departing from the spirit of my invention.

I claim:

1. In a trap nest, the combination with a front plate having an entrance opening formed therein, of rearwardly extending brackets united to the plate on opposite sides of the opening, a trap door having upper and lower pivots united to the opposite ends thereof, and a vertical slot for the upper pivot and a combined vertical and oblique slot for the lower pivot formed in the brackets adapted to receive and guide the pivots and rests for the lower pivots near the upper ends of the oblique slots, adapted to support these pivots when the door is in raised or trapping position.

2. In a trap nest, the combination with a front plate having an entrance opening formed therein, of rearwardly extending brackets united to the plate on opposite sides of the opening, a trap door having upper and lower pivots united to the opposite ends thereof, and slots formed in the brackets adapted to receive and guide the pivots and, in combination with the pivots, to detain the door either in a raised oblique position or in a lowered vertical position.

3. In a trap nest, the combnation with a front plate having an entrance opening formed therein, of rearwardly extending brackets united to the plate on opposite sides of the opening, a trap door having upper and lower pivots united to the opposite ends thereof, and slots formed in the brackets adapted to receive and guide the pivots, and in combination with the pivots, to detain the door either in a raised oblique position or in a lowered vertical position the slots and pivots being so proportioned that a slight upward and rearward pressure upon the rear edge of the door when in its oblique or trapping position, will disengage the lower pivots and permit the door to travel to its lowered vertical position.

4. In a trap nest, the combination with a front plate having an entrance opening formed therein, of rearwardly extending brackets united to the plate on opposite sides of the opening, a trap door having upper and lower pivots united to the opposite ends thereof, and slots formed in the brackets adapted to receive and guide the pivots, and in combination with the pivots, to detain the door either in a raised oblique position or in a lowered vertical position, the slots and pivots being so proportioned that a slight upward pressure upon the rear edge of the door when in its trapping or oblique position, will disengage the lower pivots and the pivots and slots will then guide the door to a lowered vertical position, as the hen clears the door.

5. In a trap nest, the combination with a front plate having an entrance opening formed therein, of rearwardly extending brackets united to the plate on opposite sides of the opening, a trap door having upper and lower pivots united to the opposite ends thereof, upper vertical slots formed in upper parts of the brackets adjacent the plate, lower slots formed in the brackets spaced from the upper slots and extending upwardly and rearwardly, and said pivots united to each end of the trap door adapted to enter the corresponding slots respectively and to slide freely therein and rests for the lower pivots near the upper ends of the oblique slots, adapted to support these pivots when the door is in raised or trapping position.

6. In a trap nest, the combination with a front plate having an entrance opening formed therein, of rearwardly extending brackets united to the plate on opposite sides of the opening, a trap door having upper and lower pivots united to the opposite ends thereof, upper vertical slots formed in upper parts of the brackets adjacent the plate, lower slots formed in the brackets spaced from the upper slots and extending upwardly and rearwardly, said pivots united to each end of the trap door adapted to enter the corresponding slots respectively and to slide freely therein, and a shoulder formed upon each of the brackets near the upper end of the lower slot adapted to form a seat or rest for its corresponding pivot when the door is in its set position.

7. In a trap nest, the combination with a front plate having an entrance opening formed therein, of rearwardly extending brackets united to the plate on opposite sides of the opening, a trap door mounted in the brackets across the opening, co-acting means comprising slots formed in the brackets, and pins united to the door at opposite edges thereof adapted to detain the door in a raised position with the top of the door adjacent the top of the opening and the bottom of the door raised and extending obliquely to the rear when in set or trapping position, and to release said trap door from its trapping position upon the application of a slight upward pressure upon the rear edge of the door.

HARRY J. CRINER.